(12) United States Patent
Yoo et al.

(10) Patent No.: US 10,192,344 B2
(45) Date of Patent: Jan. 29, 2019

(54) METHOD AND APPARATUS FOR GENERATING SHADER PROGRAM

(71) Applicant: SAMSUNG ELECTRONICS CO., LTD., Suwon-si (KR)

(72) Inventors: Donghoon Yoo, Suwon-si (KR); Seonggun Kim, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 196 days.

(21) Appl. No.: 15/255,516

(22) Filed: Sep. 2, 2016

(65) Prior Publication Data

US 2017/0069055 A1    Mar. 9, 2017

(30) Foreign Application Priority Data

Sep. 3, 2015 (KR) .................. 10-2015-0124941

(51) Int. Cl.
 *G09G 5/36* (2006.01)
 *G06T 15/00* (2011.01)
(52) U.S. Cl.
 CPC .......... *G06T 15/005* (2013.01); *G09G 5/363* (2013.01)
(58) Field of Classification Search
 CPC ...................................................... G06F 8/443
 See application file for complete search history.

(56) References Cited

U.S. PATENT DOCUMENTS

| | | | |
|---|---|---|---|
| 8,379,032 B2 | 2/2013 | Chen et al. | |
| 2003/0066061 A1* | 4/2003 | Wu | G06F 8/443 717/158 |
| 2006/0005178 A1* | 1/2006 | Kilgard | G06F 8/443 717/153 |
| 2009/0122062 A1* | 5/2009 | Kilpatrick | G06F 8/51 345/426 |
| 2013/0265309 A1 | 10/2013 | Goel et al. | |
| 2016/0291942 A1* | 10/2016 | Hutchison | G06F 8/451 |

FOREIGN PATENT DOCUMENTS

KR   10-2015-0002745 A   1/2015
KR      10-1492255 B1   2/2015

OTHER PUBLICATIONS

T. Jansen, "GPU++—An Embedded GPU Development System for General-Purpose Computations." *Doctoral Dissertation, Technische Universität München*, 2007. (pp. 1-4 in German, pp. 5-144 in English).

\* cited by examiner

*Primary Examiner* — Jitesh Patel
(74) *Attorney, Agent, or Firm* — F. Chau & Associates, LLC.

(57) ABSTRACT

A method of generating a shader program includes determining a first variable to be used to perform a folding operation that replaces operation formulas included in the shader program by a constant or a second variable, and generating a shader program in which the operation formulas are replaced by the constant or the second variable based on the determined first variable.

16 Claims, 8 Drawing Sheets

```
// Reflect about x-axis
//  ┌ 1  0  0 ┐   |x|
210 //  | 0 -10  | * |y|
//  └ 0  0  1 ┘   |1| uniform mat3 reflect_matrix;
in vec3 pos;

void main( )
{                          220                    230
    gl_position = reflect_matrix * pos; // vec3(pos.x, -pos.y, 1),
}
```

```
// U0~Un: uniform variables
// V0~Vn: non-uniform variables such as attribute variables and varying variables
// Other variables are temporal variables
a = U0;                      -- (1)    foldable, {U0}
b = U1 * 0.5;                -- (2)    foldable, {U1}
c = V0 / U2;                 -- (3)    not foldable
d = a * b;                   -- (4)    foldable, {U0, U1}
e = b + c;                   -- (5)    not foldable
if (d > 0.0) {               -- (6)    foldable, {U0, U1}
        f1 = V1 + 1;         -- (7-1)  not foldable
        g1 = d + U3;         -- (8-1)  foldable, {U0, U1, U3}
        h1 = a * 2;          -- (9-1)  foldable, {U0}
} else {
        f2 = U4 + 1;         -- (7-2)  foldable, {U4}
        g2 = 1;              -- (8-2)  constant
        h2 = b * f2;         -- (9-2)  foldable, {U1, U4}
}
// join point
f3 = phi(f1, f2);            -- (10)   not foldable (not foldable + foldable)
g3 = phi(g1, g2);            -- (11)   foldable, {U0, U1, U3} (fold + const)
h3 = phi(h1, h2);            -- (12)   foldable, {U0, U1, U4} (fold + fold)
```

| SUBSET CORRESPONDING TO NODE | WEIGHT |
|---|---|
| {U0} | 2 |
| {U1} | 1 |
| {U4} | 1 |
| {U0, U1} | 5 |
| {U0, U4} | 3 |
| {U1, U4} | 3 |
| {U0, U1, U3} | 6 |
| {U0, U1, U4} | 7 |
| {U0, U1, U3, U4} | 8 |

FIG. 8

| 1 | SELECT S FOR WHICH (Ws * N) − (|Vs| * T) IS MAXIMUM |
|---|---|
| 2 | SELECT S FOR WHICH (Ws * N) / (|Vs| * T) IS MAXIMUM |
| 3 | SELECT S FOR WHICH (Ws * N) IS MAXIMUM AMONG SETS SATISFYING |Vs| * T < F |

METHOD AND APPARATUS FOR GENERATING SHADER PROGRAM

CROSS-REFERENCE TO RELATED APPLICATION(S)

This application claims the benefit under 35 USC 119(a) of Korean Patent Application No. 10-2015-0124941 filed on Sep. 3, 2015, in the Korean Intellectual Property Office, the entire disclosure of which is incorporated herein by reference for all purposes.

BACKGROUND

1. Field

This application relates to methods and apparatuses for generating a shader program.

2. Description of Related Art

A graphics processing unit (GPU) performs various graphic operations, such as conversion, rasterizing, shading, and blending, to render three-dimensional (3D) graphics data. A shader program is a set of software commands, and is mainly used to calculate rendering effects of graphics hardware, such as the GPU. Also, the shader program may not use a pipeline of a fixed function, and may be using a low-level shading language, such as assembly language, or a high-level shading language (HLSL), such as the C language. When the shader program is created, compiling has to be performed to convert the shader program into a machine language program that can be processed by hardware.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of generating a shader program includes determining a first variable to be used to perform a folding operation that replaces operation formulas included in the shader program by a constant or a second variable; and generating a shader program in which the operation formulas are replaced by the constant or the second variable based on the determined first variable.

The method may further include calculating a performance gain of each subset generated by combining a plurality of determined first variables; and selecting a subset including a first variable to be replaced from the subsets based on the calculated performance gain of each subset; and the generating of the shader program may include generating the shader program in which the operation formulas are replaced by the constant or the second variable based on the first variable included in the selected subset.

The method may further include calculating execution times of operation formulas included in the shader program on which the folding operation can be performed; and the calculating of the performance gain may include calculating the performance gain based on the execution times.

The calculating of the performance gain may further include generating nodes corresponding to the subsets based on a lattice structure; and calculating a weight of each node, the weight being defined as a sum of the execution times of operation formulas on which the folding operation can be performed corresponding to the node and any lower nodes of the node in the lattice structure.

The calculating of the weight of each node may include calculating the weight based on an inclusion relation from a node corresponding to a null set to a node corresponding to a set of all first variables included in the shader program.

The selecting of the subset including the first variable to be replaced from the subsets may include selecting the subset based on the weight of the node and a number of first variables included in the subset.

The selecting of the subset including the first variable to be replaced from the subsets may include selecting the subset based on a number of times the shader program is called and a compiling time of the shader program.

The selecting of the subset including the first variable to be replaced from the subsets may include selecting the subset dynamically in response to the shader program being repeatedly called.

The operation formulas on which the folding operation can be performed may be operation formulas in which all operands are constants or uniform variables.

The method may further include storing in a cache a result of compiling the shader program based on the first variable and a value allocated to the first variable; and the generating of the shader program may include generating the shader program in which the operation formulas are replaced by the constant or the second variable based on the result of compiling the shader program stored in the cache.

In another general aspect, a computer-readable storage medium stores instructions for causing computing hardware to perform the method described above.

In another general aspect, a computer configured to generate a shader program includes a variable processor configured to determine a first variable to be used to perform a folding operation that replaces operation formulas included in the shader program by a constant or a second variable; and a shader program generator configured to generate a shader program in which the operation formulas are replaced by the constant or the second variable based on the determined first variable.

The variable processor may be further configured to calculate a performance gain of each subset generated by combining a plurality of determined first variables, and select a subset including the first variable to be replaced from the subsets based on the calculated performance gain of each subset; and the shader program generator may be further configured to generate the shader program in which the operation formulas are replaced by the constant or the second variable based on the first variable included in the selected subset.

The variable processor may be further configured to calculate execution times of operation formulas included in the shader program on which the folding operation can be performed; and calculate the performance gain based on the execution times.

The variable processor may be further configured to generate nodes corresponding to the subsets based on a lattice structure; and calculate a weight of each node, the weight being defined as a sum of the execution times of operation formulas on which the folding operation can be performed corresponding to the node and any lower nodes of the node in the lattice structure.

The variable processor may be further configured to calculate the weight of each node based on an inclusion relation from a node corresponding to a null set to a node corresponding to a set of all first variables included in the shader program.

The variable processor may be further configured to select the subset based on the weight of the node and a number of first variables included in the subset.

The variable processor may be further configured to select the subset based on a number of times the shader program is called and a compiling time of the shader program.

The operation formulas on which the folding operation can be performed may be operation formulas in which all operands are constants or uniform variables.

The variable processor may be further configured to store in a cache a result of compiling the shader program based on the first variable and a value allocated to the first variable; and the shader program generator may be further configured to generate the shader program in which the operation formulas are replaced by the constant or the second variable based on the result of compiling the shader program stored in the cache.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Most of the terms used herein are general terms that have been widely used in the technical art to which this application pertains. However, some of the terms used herein may have been created to reflect intentions of technicians in this art, precedents, or new technologies. Also, some of the terms used herein may have been arbitrarily chosen by the inventors, in which case any such terms are defined in detail below. Accordingly, the specific terms used herein are to be interpreted based on the unique meanings thereof and the whole context of this disclosure.

When a part "includes" or "comprises" an element, unless stated otherwise, the part may further include other elements, not excluding the other elements.

Although terms such as "first," "second," "third," etc., may be used herein to describe various elements, components, regions, layers, and sections, these elements, components, regions, layers, and sections are not to be limited by these terms. Rather, these terms are only used to distinguish one element, component, region, layer, or section from another element, component, region, layer, or section.

Figure 1:
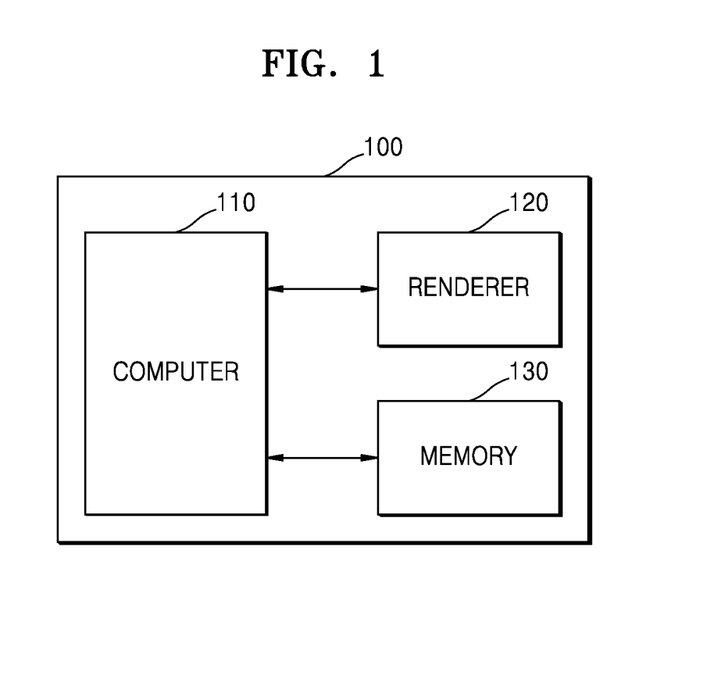
FIG. 1 is a view of an example of a graphics system.

FIG. 1 is a view of an example of a graphics system 100.

Referring to FIG. 1, the graphics system 100 includes a computer 110, a renderer 120, and a memory 130. FIG. 1 illustrates only components of the graphics system 100 that are related to examples described herein. However, it will be apparent to one of ordinary skill in the art that the graphics system 100 may also include other general-purpose components in addition to the components illustrated in FIG. 1.

Examples of the graphics system 100 include a desktop computer, a laptop computer, a smartphone, a personal digital assistant (PDA), a portable media player, a video game console, a television set-top box, a tablet device, an E-book reader, a wearable device, and a head-mounted display (HMD) display, but the graphics system 100 is not limited thereto. In other words, the graphics system 100 is a device that has a graphics processing function to display content, and various devices are included in the scope of the graphics system 100.

The computer 110 is hardware for controlling general operations and functions of the graphics system 100, and may include a central processing unit (CPU). For example, the computer 110 runs an operating system (OS), calls a graphics application programming interface (API) for the renderer 120, and executes a driver of the renderer 120. Also, the computer 110 may execute various applications stored in the memory 130. For example, the computer 110 may execute a web browsing application, a game application, and a video application.

The renderer 120 is a device for executing a graphics pipeline, and may be a dedicated graphics processor including a graphics processing unit (GPU). That is, the renderer 120 may be hardware configured to execute a three-dimensional (3D) graphics pipeline to render 3D objects on a 3D image into a two-dimensional (2D) image for display. For example, the renderer 120 may perform various functions, such as shading, blending, and illuminating, and various other functions for generating pixel values of pixels to be displayed. Also, although FIG. 1 illustrates that the renderer 120 is included in the graphics system 100, the renderer 120 may be a device included in an external graphics system that may be accessed by the graphics system 100.

The memory 130 is hardware for storing various data processed in the graphics system 100. For example, the memory 130 stores data that has been processed and data to be processed in the computer 110 and the renderer 120. Also, the memory 130 may store applications and drivers that are to be executed by the computer 110 and the renderer 120. The memory 130 may include any one or any combination of any two or more of random-access memory (RAM), such as dynamic random-access memory (DRAM) and static random-access memory (SRAM), read-only memory (ROM), electrically erasable programmable read-only memory (EEPROM), CD-ROM, Blu-ray or other optical disk drives, a hard disk drive (HDD), a solid state drive (SSD), and a flash memory. Furthermore, the memory 130 may include other external storage devices that may be accessed by the graphics system 100.

The computer 110 compiles a shader program and transmits the compiled shader program to the renderer 120 to process graphics data. The shader program is a graphics hardware program developed to represent 3D graphics, and the compiling converts the shader program into a machine language program.

When the shader program is executed, the time to perform an operation included in the shader program and the time to retrieve an operand from the memory 130 are consumed. Thus, if the operation is removed by replacing, in advance, an operand having a value that does not change during the execution of the shader program by a constant, the execution time of the shader program may be reduced and a speed of graphics processing may be improved.

A uniform variable may be declared in the shader program. The uniform variable is a global variable that is used throughout the shader program, and after a value of the uniform variable is allocated before the shader program is executed, the value does not change during the execution of the shader program. Thus, when the uniform variable is replaced by a constant when compiling the shader program, the execution time of the shader program may be reduced as described above.

Figure 2:
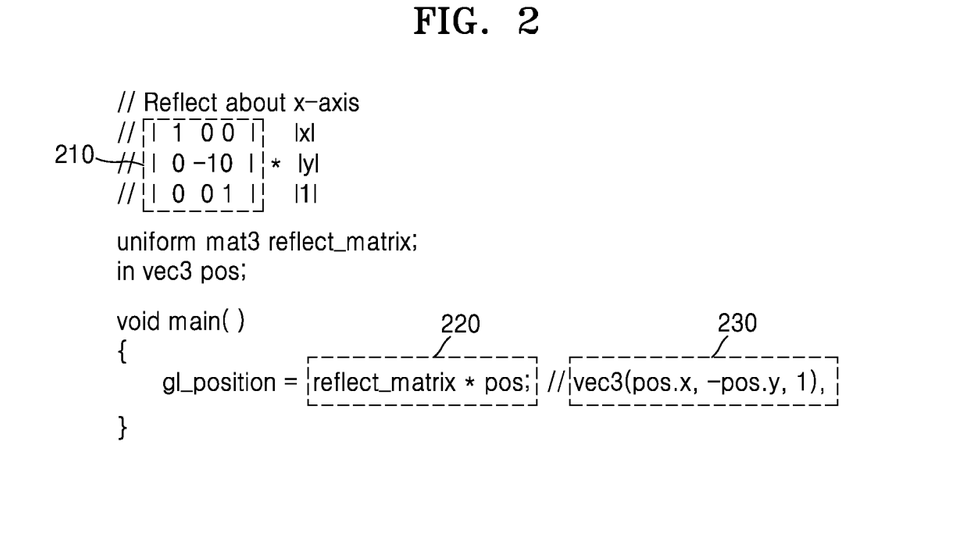
FIG. 2 is a view of an example of folding an operation formula in a shader program.

FIG. 2 is a view of an example of folding an operation formula in the shader program.

The term "folding" denotes removing an operator included in an operation formula and replacing the operation formula by a variable or a constant. For example, constant folding is defined as an operation in which a compiler performs in advance an operation included in an operation formula to replace the operation formula by a constant in which an operator is removed. However, the term "folding" denotes not only replacing the operation formula by a constant, but also replacing the operation formula by a variable.

FIG. 2 is an example of a shader program that converts 3D coordinates. In detail, the shader program of FIG. 2 receives a 3D coordinate in which a value z is fixed and outputs 3D a coordinate obtained by reflecting the received 3D coordinate in which the value z is fixed about an x axis. In detail, a variable reflect_matrix is a uniform variable of a matrix type, and a variable pos is an input variable of a vector type indicating a 3D coordinate. Referring to FIG. 2, a variable gl_position stores a result of multiplying the variable reflect_matrix by the variable pos. When the variable gl_position is created in the shader program as an operation formula 220 including operands (the variable reflect_matrix and the variable pos) and an operator (multiplication), the shader program performs an operation by retrieving values stored in areas of the variable reflect_matrix and the variable pos designated in a memory. Thus, most of the execution time to perform the operation is the time for retrieving the values stored in each area of the memory.

However, if the operation formula is folded within a range in which the variable is not changed and then compiled, the time for performing an operation and the time for retrieving a value of the variable from the memory are not needed, and thus the total execution time may be decreased. That is, when the uniform variable used as the global variable in the shader program is replaced by a constant, the total execution time is reduced.

Referring to FIG. 2, the variable gl_position may be represented as a vector variable 230 rather than by the operation formula 220 including the operator and the operand. That is, the variable reflect_matrix, which is the uniform variable, is maintained as a matrix 210 formed of constants, while the shader program is executed. Thus, the variable gl_position is folded as the vector variable 230, which is a processed value of the variable pos, rather than as the result of multiplying the variable reflect_matrix by the variable pos. In this case, while the value stored in the variable gl_position is the same, the time to perform the operation is reduced.

Figure 3A:
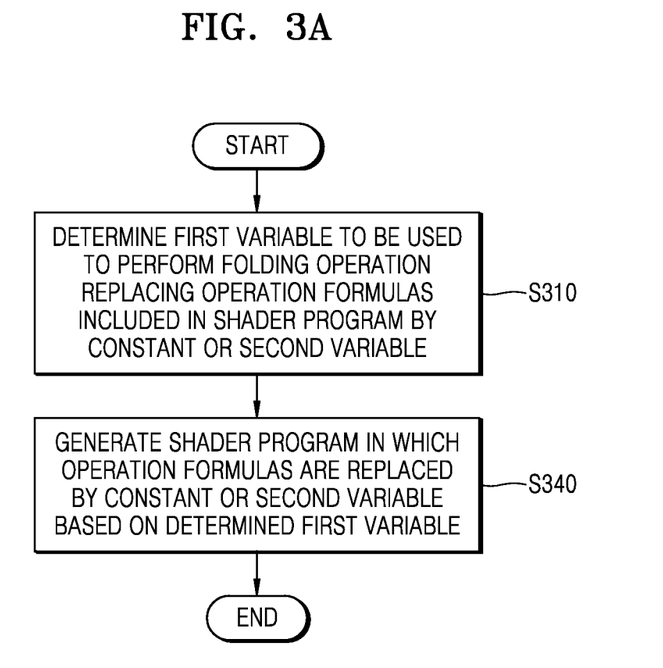
FIG. 3A is a flowchart of an example of a method of generating a shader program.

FIG. 3A is a flowchart of an example of a method of generating a shader program.

In operation S310, the computer 110 determines a first variable used to perform a folding operation that replaces operation formulas included in the shader program by a constant or a second variable. The first variable is a variable included in the operation formula, and the second variable is a result of the replacement of the operation formula. Thus, the second variable may be the same as or different than the first variable, and the second variable and the first variable may be a uniform variable. For example, when the uniform variable is the operation formula itself, the second variable may be the same variable as the first variable. In one example, the computer 110 determines that an operation formula is foldable when all operands included in the operation formula are constants or uniform variables. When the operation formula is foldable, the first variable to be used for the folding operation is determined.

In operation S340, the computer 110 generates the shader program in which the operation formulas are replaced by the constant or the second variable based on the determined first variable. In one example, the computer 110 determines a uniform variable to be used for the folding operation, and generates the shader program in which the operation formulas are replaced by constants based on the determined uniform variable.

Figure 3B:
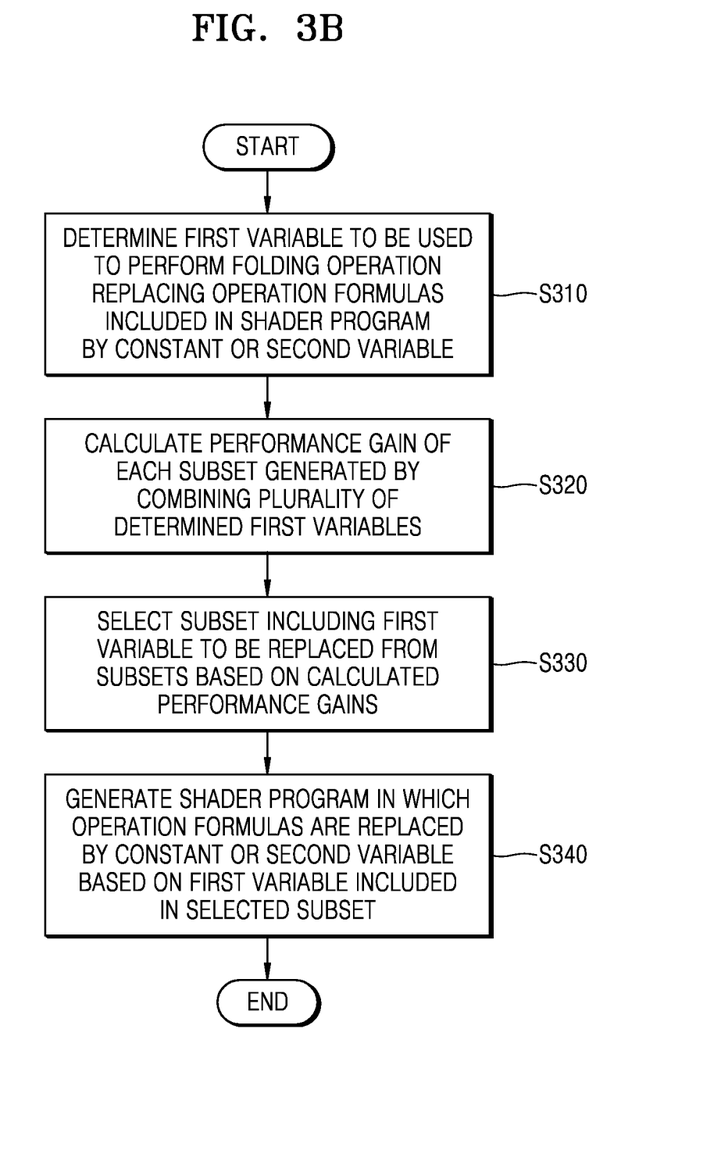
FIG. 3B is a detailed flowchart of the example of a method of generating a shader program of FIG. 3A.

FIG. 3B is a detailed flowchart of the example of a method of generating the shader program of FIG. 3A.

Operation S310 is the same as operation S310 of FIG. 3A, and thus a detailed description thereof has been omitted.

In operation S320, the computer 110 calculates a performance gain of each subset generated by combining a plurality of determined first variables. For example, if a set including all of the uniform variables included in the shader program is defined as a set U, each subset, the performance gain of which is to be calculated, is a subset of the set U. The computer 110 generates a node corresponding to each subset based on a lattice structure.

The performance gain is calculated based on a weight in operation S320. The weight is defined as a sum of the execution times that are eliminated as operations included in operation formulas that are foldable are removed. The performance gain denotes a total time gain that is reduced by performing the folding operation. For example, when the shader program is called a plurality of times, the performance gain is a value obtained by multiplying the number of times the shader program is called by the weight. The method of calculating the performance gain will be described in more detail below.

In operation S330, the computer 110 selects a subset including the first variable to be replaced based on the calculated performance gain. The subset including the first variable to be replaced may be selected by taking into account the weight of a node and the number of first variables included in the subset. Also, the subset including the first variable to be replaced may be selected based on the number of times the shader program is called and the compiling time of the shader program. If the shader program is repeatedly called, the subset including the first variable to be replaced may be dynamically selected whenever the shader program is called. However, the method by which the subset is selected is not limited to these examples.

In operation S340, the computer 110 generates the shader program in which the operation formulas are replaced by the constant or the second variable based on the first variable included in the subset selected in operation S330.

Figure 4:
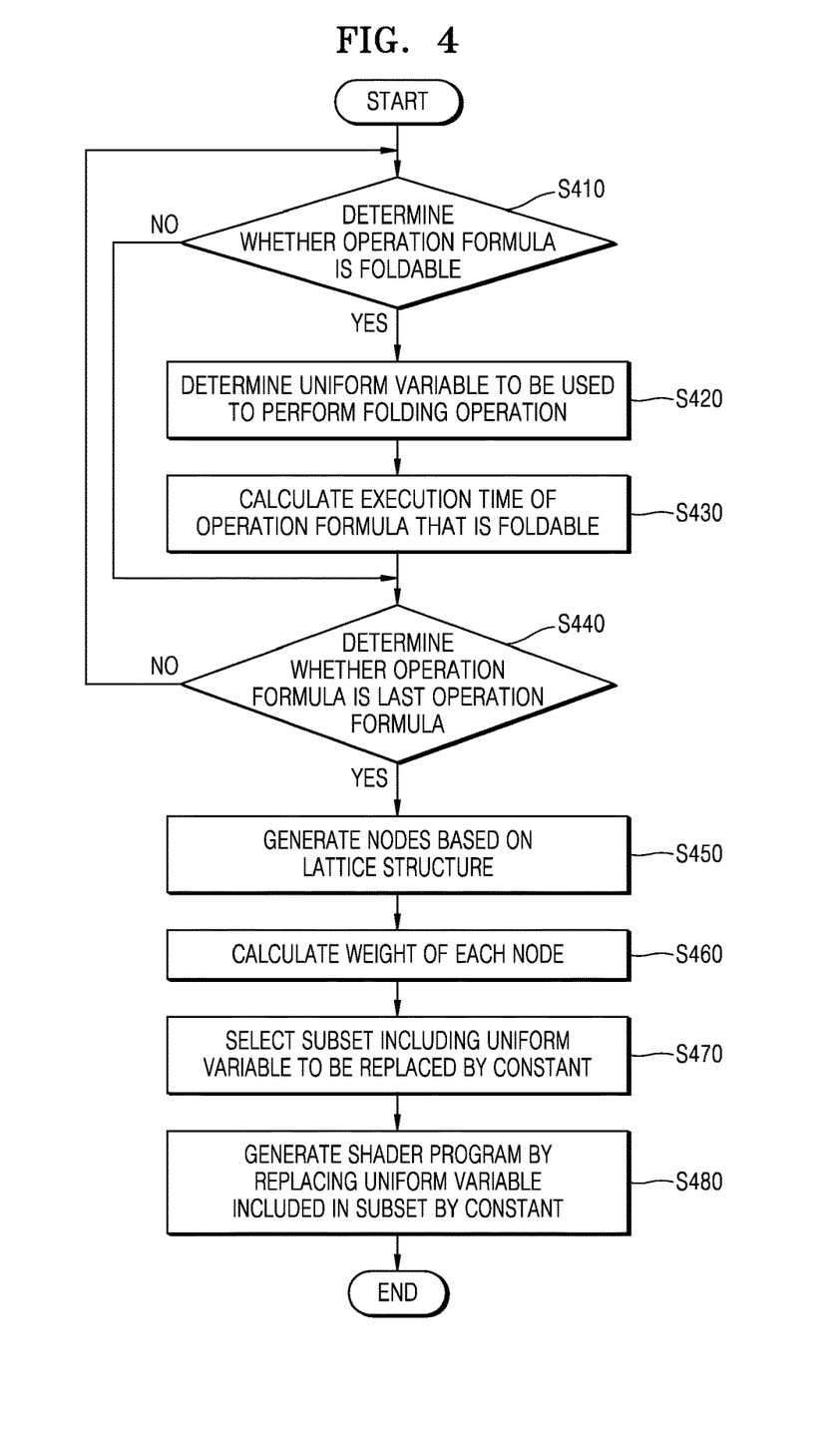
FIG. 4 is a detailed flowchart of an example of a method of generating a shader program.

FIG. 4 is a detailed flowchart of an example of a method of generating a shader program.

FIG. 4 is a view for describing an example in which the first variable is a uniform variable, wherein the first variable may include various variable forms.

In operation S410, the computer 110 determines whether an operation formula included in the shader program is foldable. In detail, if all operands included in the operation formula are a constant or a uniform variable, the operation formula is determined to be foldable. If the operation formula is foldable, operations S420 and S430 are performed. Otherwise, if the operation formula is not foldable, the method jumps to operation S440.

In operation S420, the computer 110 determines the uniform variable to be used to perform a folding operation. A subset S including all of the uniform variables that are to be used to fold all operation formulas that are foldable included in the shader program may be defined.

In operation S430, the computer 110 calculates an execution time of the operation formula that is foldable. The execution time is a time during which operations included in the operation formula is performed, and is defined as C. For example, the execution time C of the operation formula may be represented by $\Sigma w_i$, wherein $w_i$ denotes a time during which an i-th operation included in the operation formula is performed.

Also, a branching statement's execution time C may be calculated as a sum of the execution time of operations that are removed for each path. For example, when the total execution time of the operation formulas executed when a condition of the branch statement is met is $t_T$, and the total execution time of the operation formulas executed when the condition of the branch statement is not met is $t_F$, the execution time C of the branch statement may be represented by Equation 1 below.

$$C = P_T * t_T + P_F * t_F \quad (1)$$

In Equation 1, $P_T$ denotes a probability that the condition of the branch statement will be met, and $P_F$ denotes a probability that the condition of the branch statement will not be met. $P_T$ and $P_F$ may be predefined, or may be input directly by a user, but are not limited thereto. $t_T$ may be represented by $\Sigma w_j$, wherein $w_j$ denotes a time during which a j-th operation executed when the condition of the branch statement is met is performed. Also, $t_F$ may be represented by $\Sigma w_k$, wherein $w_k$ denotes a time during which a k-th operation executed when the condition of the branch statement is not met is performed.

Whether each operation formula is foldable, the subset S, and the execution time C may be obtained using a data-flow analysis framework or a control-flow analysis framework.

In operation S440, the computer 110 determines whether the operation formula is a last operation formula of the shader program. If the operation formula is the last operation formula, the computer 110 performs operations S450 through S480. Otherwise, if the operation formula is not the last operation formula, the computer 110 starts the operations again beginning from operation S410.

In operation S450, the computer 110 generates nodes based on a lattice structure. If the set including all of the uniform variables declared in the shader program is defined as a set U, nodes corresponding to all subsets included in the set U may be generated based on the lattice structure. The nodes may be generated based on an inclusion relation from a node corresponding to a null set to a node corresponding to the set U.

In operation S460, the computer 110 calculates a weight of each node. The weight is defined as a sum of the execution times C of the operation formulas that are removed by the folding operation. To calculate the weight, first, an initial value of the weight of each node is calculated. The initial value of the weight of a node is the sum of the execution times C of all operation formulas, if any, that require all uniform variables included in a subset of uniform variables corresponding to the node to perform folding. To calculate the weight of the node, after the initial value of the weight is calculated, weights of lower subsets are added based on the inclusion relation from the null set to the set U. The method of calculating the weight will be described in more detail below.

In operation S470, the computer 110 selects a subset including a uniform variable to be replaced by a constant. The computer 110 may select a node to be including a uniform variable to replaced by taking into account a performance gain calculated per node. Conditions for selecting the node may vary depending on situations. The method of selecting the set of uniform variables will be described in more detail below.

In operation S480, the computer 110 generates the shader program by replacing the uniform variable included in the subset by a constant. Operation S480 corresponds to operation S340 of FIG. 3B, and thus a detailed description thereof has been omitted.

Figure 5:
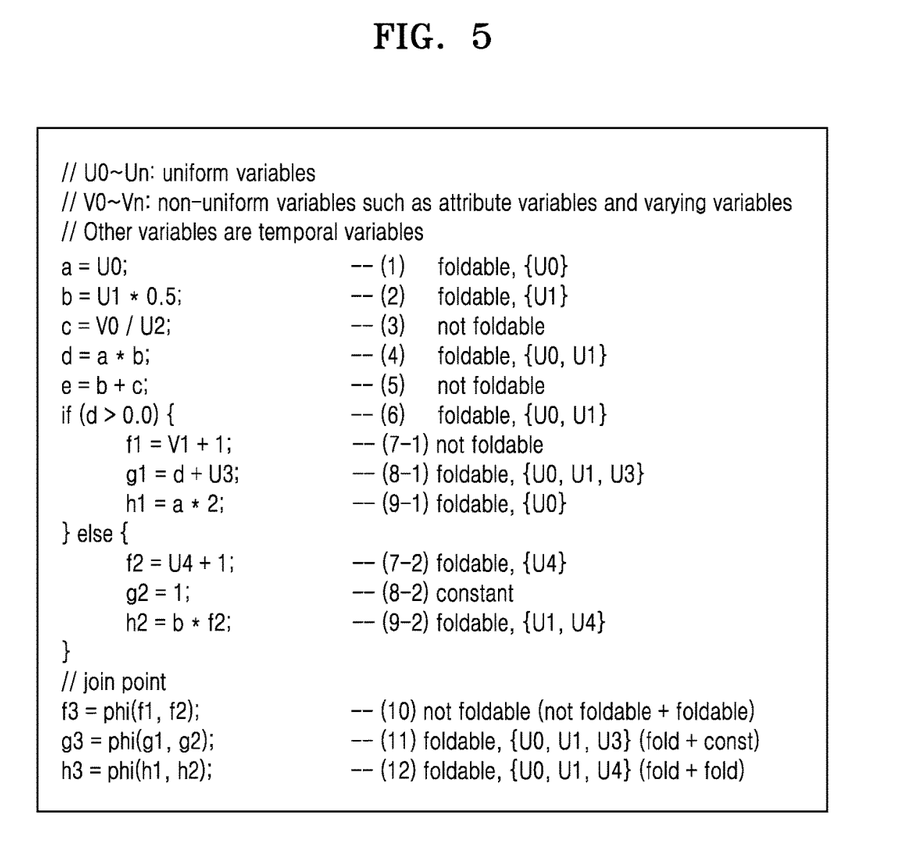
FIG. 5 is a view of an example of a shader program for describing an operation of determining a first variable to be used for folding operation formulas included in the shader program.

FIG. 5 is a view of an example of a shader program for describing an operation of determining a first variable to be used to fold operation formulas included in the shader program.

FIG. 5 is a view for describing an example in which the first variable is a uniform variable, wherein the first variable may include various variable forms.

Referring to FIG. 5, the uniform variables are declared to be U0 through Un. Also, V0 through Vn denote non-uniform variables, such as attribute variables and varying variables, and the other variables are defined as temporal variables. Also, the shader program of FIG. 5 is shown in a three-address static single assignment form for convenience of analysis. The three-address static single assignment form is a form in which one operation formula includes one operator and two operands. If the three-address static single assignment form is applied, the shader program may be statically analyzed by arranging each type only once and relabeling the type. Thus, the three-address static single assignment form is an effective intermediate code for code analysis.

Referring to FIG. 5, in equations (1) through (5), variables a through e are respectively declared. The variable a is the uniform variable U0 itself, and the variable b has operands that are the uniform variable U1 and a constant 0.5, and thus equations (1) and (2) for calculating the variables a and b are operation formulas that are foldable. Also, in the case of equation (4) for obtaining the variable d, the operands are the uniform variables U0 and U1, and thus equation (4) is also foldable. However, in the case of equations (3) and (5) for obtaining the variables c and e, the non-uniform variable V0 is included as an operand, and thus equations (3) and (5) are not foldable.

Also, referring to FIG. 5, the shader program includes a branch statement. For example, when different operations are performed for the case in which a value of the variable d is greater than 0 and the case in which the value of the variable d is less than or equal to 0, as in the case of equation (6), it has to be determined whether all operation formulas included in every branch are foldable or not. In the case of equation (7-1), the non-uniform variable V1 is included, and thus equation (7-1) is not foldable, while in the case of equation (6), equation (7-2), and equations (8-1) through (9-2), all operands included in operation formulas are constants or uniform variables, and thus equation (6), equation (7-2), and equations (8-1) through (9-2) are foldable.

In FIG. 5, in the case of an operation formula that is foldable, a uniform variable used for folding is indicated together with the operation formula. For example, in the case of equation (2), since the uniform variable U1 is needed to perform folding, '{U1}' is indicated in equation (2) in FIG. 5. In the case of equation (4), since both the uniform variable U0 used to fold the variable a and the uniform variable U1 used to fold the variable b are needed, '{U0, U1}' is indicated. Also, to fold equation (8-1) for obtaining the variable g1, the uniform variables U0 and U1 used to fold the variable d and the uniform variable U3 are needed. The variable g2 is a constant, and thus the variable g2 is always foldable.

Referring to FIG. 5, after the branch statement operation is performed, a phi ( ) operation is performed. The phi ( ) operation is a function collecting results of every branch with respect to the variables included in the branch statement. For example, in equation (10), the variable f3 is obtained by the phi ( ) operation of f1 and f2. Thus, if results of the variable f1, which is not foldable, and the variable f2, which is foldable, are collected, the variable f3 is determined to be not foldable. This is because the folding is possible when the branch including the variable f2 is executed, while the folding is impossible when the branch including the variable f1 is executed. Likewise, the variable g3 included in equation (11) is obtained by collecting results of g1, which may be folded using a subset of uniform variables {U0, U1, U3} and g2, which is a constant. Thus, equation (11) is an operation formula that may be folded using the subset of uniform variables {U0, U1, U3}. The phi ( ) operation is a function for analyzing the program, and thus the execution time C of the phi ( ) operation is 0. Likewise, the variable h3 included in equation (12) is obtained by collecting results of h1, which may be folded using the uniform variable U0, and h2, which may be folded using a subset set of uniform variables {U0, U1, U4}. Thus, equation (12) is an operation formula that may be folded using the subset of uniform variables {U0, U1, U4}.

Figure 6:
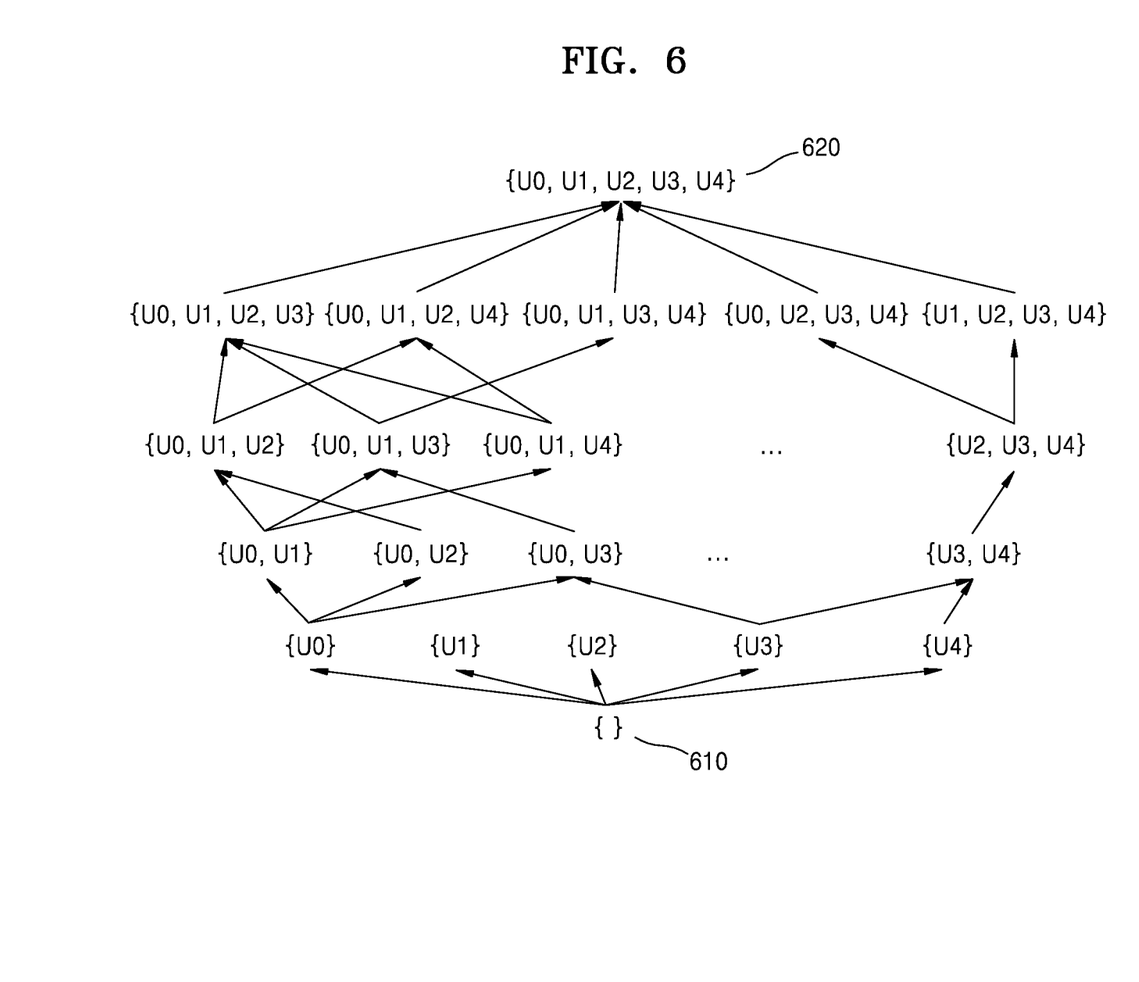
FIG. 6 is a view of an example of nodes generated based on a lattice structure.

FIG. 6 is a view of an example of nodes based on a lattice structure.

FIG. 6 is a view for describing an example in which a first variable is a uniform variable, wherein the first variable may include various variable forms.

Referring to FIG. 6, the nodes are indicated as subsets including the uniform variables. The nodes are generated based on a lattice structure, wherein the lattice structure denotes a structure based on an inclusion relation from a node 610 corresponding to a null set to a node 620 corresponding to a set U of all of the uniform variables U0, U1, U2, U3, U4 in the shader program.

Figure 7:
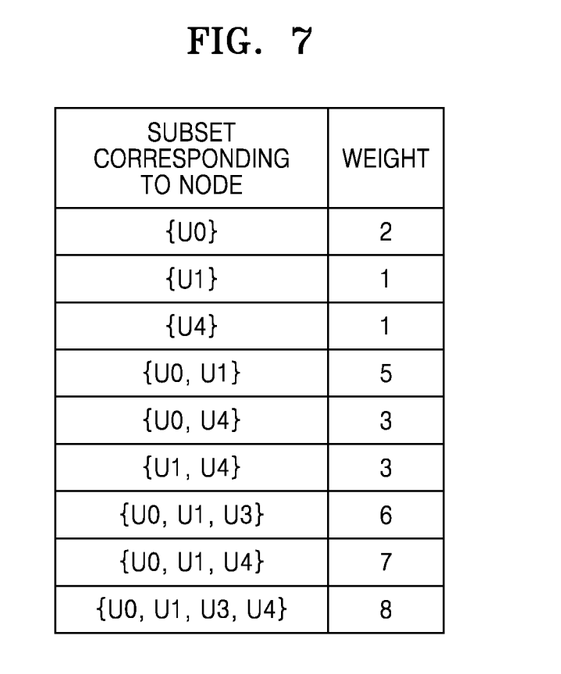
FIG. 7 is a view of an example of weights of nodes corresponding to subsets including a uniform variable that is a first variable.

FIG. 7 is a view of an example of weights of nodes corresponding to subsets including a uniform variable that is a first variable.

In the shader program of FIG. 5, if it is assumed that the execution time C of the operation formula is 1 with respect to equations (1) through (9-2), some nodes have weights as illustrated in FIG. 7. For example, when folding is performed in FIG. 5, the operation formulas needing only the uniform variable U0 are equations (1) and (9-1). Thus, if it is assumed that the execution time C of all operation formulas is 1, the weight of the node {U0} is 2. In FIG. 5, since equations (2) and (7-1) are equations needing only the uniform variables U1 and U4, respectively, for the folding operation, the weights of the nodes {U1} and {U4} are 1. Also, since there are no equations needing only the uniform variables U2 and U3 for the folding operation, the weights of the nodes {U2} and {U3} are 0. FIG. 6 illustrates only some of the nodes, and thus the weights of the nodes {U2} and {U3} that are 0 are omitted.

Also, to calculate a weight of a node corresponding to a subset including a plurality of uniform variables, first an initial value of the weight of the node has to be calculated, and then weights of nodes corresponding to subsets of the subset including the plurality of uniform variables corresponding to the node has to be added. For example, in the case of a node {U0, U1}, the operation formulas that need the uniform variable {U0, U1} are equations (4) and (6), and thus the initial value of the weight of the node {U0, U1} is 2. Also, since {U0, U1} has {U0} and {U1} as subsets, the weights 2 and 1, respectively, of the nodes {U0} and {U1} have to be added to the initial value 2 of the weight of the node {U0, U1}. Thus, the weight of the node {U0, U1} is 5.

Also, in FIG. 5, the initial value of the weight of the node {U0, U4} is 0. This is because there is no operation formula that needs the uniform variable {U0, U4} for a folding operation. Thus, only the weights 2 and 1, respectively, of the nodes {U0} and {U4}, which are subsets of {U0, U4}, are added, so the weight of the node {U0, U4} is 3.

Likewise, to calculate the weight of the node {U1, U4}, first the initial value of the weight has to be calculated. Referring to FIG. 5, the operation formula that needs the uniform variable {U1, U4} for folding is equation (9-2), and thus the initial value of the weight of the node {U1, U4} is 1. Also, {U1, U4} has {U1} and {U4} as subsets, and thus the weights 1 of the nodes {U1} and {U4} have to be added. Thus, the weight of the node {U1, U4} is 3.

The uniform variable {U0, U1, U3} is a set of the uniform variables needed to fold equation (8-1) of FIG. 5, and thus the initial value of the weight of the node {U0, U1, U3} is 1. The weight of the node {U0, U1, U3} is obtained by adding together the initial value 1 of the node {U0, U1, U3} and the initial values of the weights of the nodes {U0}, {U1}, {U3}, {U0, U1}, {U1, U3}, and {U0, U3}, which are all of the subsets of the node {U0, U1, U3}. The reason that the initial values of the weights of all of the subsets have to be added, rather than the weights of all of the subsets, is that the weights of all of the subsets already reflect the weights of all of the lower subsets included in the subset. Thus, if the weights are just added, the result that is obtained will duplicatively reflect the same subset. For example, since the weight 2 of the node {U0} is already reflected in the weights 5 and 2, respectively, of the nodes {U0, U1} and {U0, U3}, if the weights 5 and 2, respectively, of the nodes {U0, U1} and {U0, U3} are just added, the weight 2 of the node {U0} will be duplicatively reflected in the result. Thus, if the initial value 1 of the weight of the node {U0, U1, U3} and the initial values 2, 1, 0, 2, 0, 0, respectively, of the weights of the nodes {U0}, {U1}, {U3}, {U0, U1}, {U1, U3}, and {U0, U3} corresponding to all of the subsets of the node {U0, U1, U3} are added together, the weight of the node {U0, U1, U3} is 6.

Likewise, in the case of the node {U0, U1, U4}, there exists no operation formula that needs the uniform {U0, U1, U4} for folding, and thus the initial value of the weight of the node {U0, U1, U4} is 0. Thus, if the initial value 0 of the weight of the node {U0, U1, U4} and the initial values 2, 1, 1, 2, 1, 0, respectively, of the weights of the nodes {U0}, {U1}, {U4}, {U0, U1}, {U1, U4}, and {U0, U4} corresponding to all of the subsets of the node {U0, U1, U4} are added together, the weight of the node {U0, U1, U4} is 7.

Likewise, in the case of the node {U0, U1, U3, U4}, there exists no operation formula that needs the uniform variable {U0, U1, U3, U4} for folding, and thus the initial value of the weight of the node {U0, U1, U3, U4} is 0. Thus, if the initial value 0 of the weight of the node {U0, U1, U3, U4} and the initial values 2, 1, 0, 1, 2, 0, 0, 0, 1, 0, 1, 0, 0, and 0, respectively, of the weights of the nodes {U0}, {U1}, {U3}, {U4}, {U0, U1}, {U0, U3}, {U0, U4}, {U1, U3}, {U1, U4}, {U3, U4}, {U0, U1, U3}, {U0, U1, U4}, {U1, U3, U4}, and {U0, U3, U4} corresponding to all of the subsets of the node {U0, U1, U3, U4} are added together, the weight of the node {U0, U1, U3, U4} is 8.

As can be seen from the above discussion, the weight of a node is the sum of execution times of operation formulas corresponding to the node and any lower nodes of the node in the lattice structure. For example, the weight of the node {U0, U1, U3} in FIG. 6 is the sum of the execution times of operation formula or equation (8-1) in FIG. 5 corresponding to the node {U0, U1, U3}, operation formulas or equations (4) and (6) in FIG. 5 corresponding to the node {U0, U1} in FIG. 6, which is a lower node of the node {U0, U1, U3} in the lattice structure in FIG. 6, operation formulas or equations (1) and (9-1) in FIG. 5 corresponding to the node {U0} in FIG. 6, which is a lower node of the node {U0, U1, U3} in the lattice structure in FIG. 6, and operation formula or equation (2) in FIG. 5 corresponding to the node {U1} in FIG. 6, which is a lower node of the node {U0, U1, U3} in the lattice structure in FIG. 6.

Figure 8:
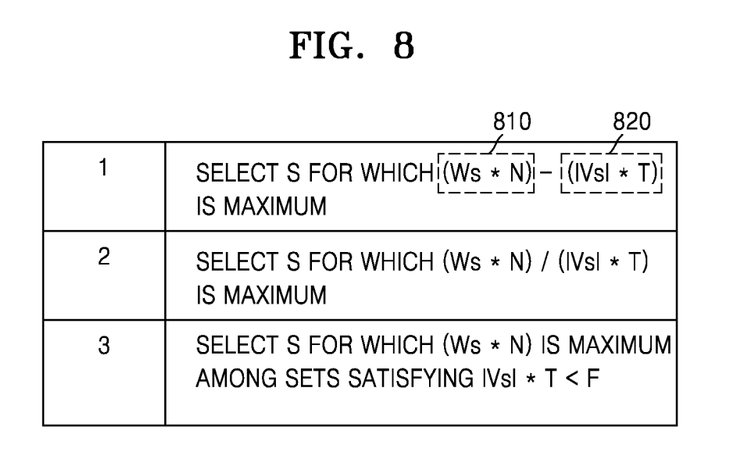
FIG. 8 is a view of examples of conditions for selecting a node.

FIG. 8 is a view of examples of conditions for selecting a subset.

FIG. 8 is a view for describing an example in which a first variable is a uniform variable, wherein the first variable may include various variable forms.

It will be apparent to one of ordinary skill in the art that other conditions for selecting a subset including a uniform variable to be replaced may be used in addition to the conditions for selecting a subset including a uniform variable to be replaced illustrated in FIG. 8.

A weight is defined as a sum of the execution times that are eliminated when operations are removed from an operation formula that is foldable. A performance gain denotes a total time gain decreased by performing the folding. Thus, if the weight of a node corresponding to a subset {U0, U1, U3} is $W_{\{U0,\ U1,\ U3\}}$, the total performance gain becomes $W_{\{U0,\ U1,\ U3\}}*N$ when a shader program is called N times.

When at least one uniform variable of the subset {U0, U1, U3} is changed, the entire shader program has to be recompiled to reflect the changed uniform variable, and thus there is overhead compared to the case when the folding operation is not performed. If the uniform variable that is changed is represented as a set, it may be represented by Equation 2 below.

$$V_{\{U0,U1,U3\}} = \left\langle v_0^k, v_1^k, v_3^k \right\rangle \tag{2}$$

In Equation 2, $v_0^k$, $v_1^k$, $v_3^k$ are values of the uniform variables U0, U1, U3 when the shader program is called for a k-th time. A size $|V_{\{U0,\ U1,\ U3\}}|$ of the set $V_{\{U0,\ U1,\ U3\}}$ is the number of times recompiling is performed due to the change of the uniform variable, and thus the total overhead is $|V_{\{U0,\ U1,\ U3\}}|*T$, in which the number of times recompiling is performed is multiplied by a recompiling time T. In FIG. 8, Ws denotes the weight of a node corresponding to a subset S of uniform variables, and |Vs| denotes a size of a set Vs of values of the uniform variables of the subset S when the shader program is called for a k-th time.

An optimal subset including a uniform variable to be replaced may be selected in various situations according to the selection conditions illustrated in FIG. 8.

If the number of times N the shader program is called and the recompiling time T are known in detail, and the rendering and the shader compiling are sequentially performed, the subset including the uniform variable to be replaced may be selected according to a first condition illustrated in FIG. 8. In general, when the computer 110 transmits a compiling result to the renderer 120, the renderer 120 has to perform rendering. If the computer 110 has to perform the compiling based on a previous rendering result, the computer 110 cannot perform the compiling while the renderer 120 performs rendering. In this case, the computer 110 selects a subset S of uniform variables corresponding to a node for which a value obtained by subtracting a total overhead 820 from a total performance gain 810 is a maximum.

If only the relation between the number of times N the shader program is called and the recompiling time T is known, and N and T are not known in detail, the subset including the uniform variable to be replaced may be selected according to a second condition illustrated in FIG. 8. Since only the relation between N and T is known, the subset S of uniform variables corresponding to a node for which a ratio of the total performance gain 810 to the total overhead 820 is a maximum is selected.

Finally, if the number of times N the shader program is called and the recompiling time T are known in detail, and the rendering and the shader compiling simultaneously occur, the subset including the uniform variable to be replaced may be selected according to a third condition illustrated in FIG. 8. If the computer 110 can continually perform compiling regardless of the previous rendering result, the computer 110 and the renderer 120 can simultaneously perform the shader compiling and the rendering. Thus, the subset S of uniform variables corresponding to a node for which the total performance gain 810 is a maximum among nodes for which the total overhead 820 is less than a predetermined threshold value F is selected.

Figure 9:
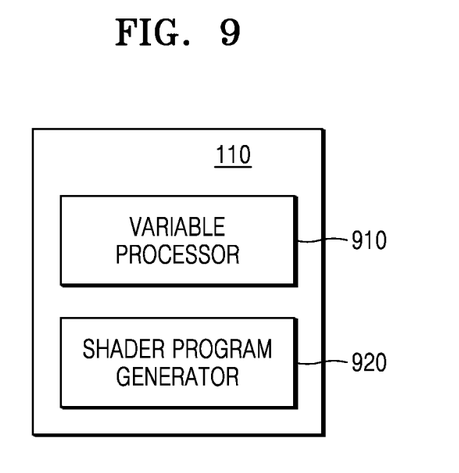
FIG. 9 is a view of an example of a computer.

FIG. 9 is a view of an example of a computer 110.

The computer 110 includes a variable processor 910 and a shader program generator 920. However, it will be apparent to one of ordinary skill in the art that the computer 110 may further include other general-purpose hardware components in addition to the components illustrated in FIG. 9. The methods described with reference to FIGS. 3A and 3B may be performed by the variable processor 910 and the shader program generator 920 of the computer 110 of FIG. 9.

The variable processor 910 determines a first variable to be used to perform folding in which operation formulas included in a shader program are replaced by a constant or a second variable. Folding is an operation in which an operator included in the operation formula is removed, and the operation formula is replaced by a variable or a constant.

The variable processor 910 determines an operation formula to be foldable when all operands included in the operation formula are constants or uniform variables. If the operation formula is foldable, the uniform variable to be used for folding is determined.

The variable processor 910 calculates a performance gain of each subset generated by combining a plurality of determined first variables. For example, if a set including all uniform variables included in the shader program is defined as a set U, the subsets for which the variable processor 910 is to calculate the performance gain are all subsets of the set U. The performance gain is calculated based on a weight. The weight is defined as a sum of the execution times that are eliminated as operations included in operation formulas that are foldable are removed.

The variable processor 910 selects a subset including the first variable to be replaced based on the calculated performance gains. The subset including the first variable to be replaced may be selected by taking into account a weight of a node and the number of first variables included in the subset. The subset including the first variable to be replaced to be replaced may be selected based on the number of times the shader program is called and the compiling time of the shader program. If the shader program is repeatedly called, the subset including the first variable to be replaced may be dynamically selected whenever the shader program is called. However, the method by which the subset is selected is not limited to these examples.

The shader program generator 920 generates the shader program in which the operation formulas are replaced by the constant or the second variable based on the determined first variable. Also, in one example, the shader program in which the first variable included in the selected subset is replaced by the constant is generated. That is, the shader program is generated by compiling the shader program.

Figure 10:
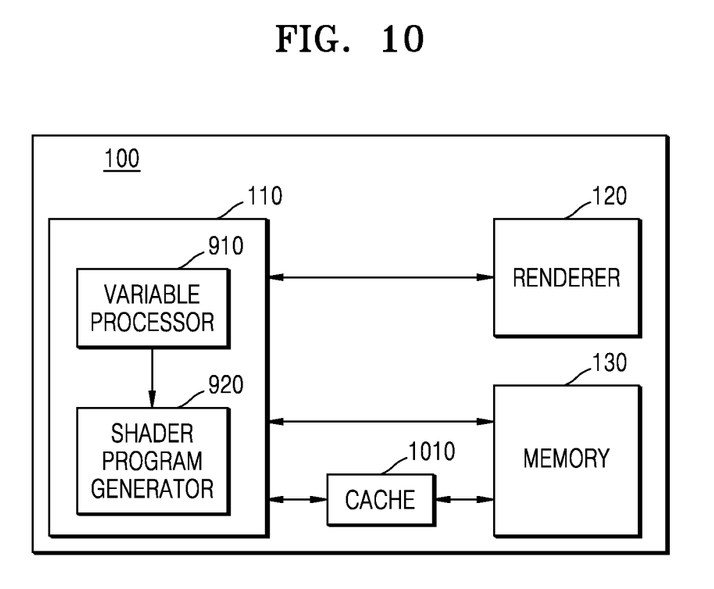
FIG. 10 is a view of an example of a graphics system.

FIG. 10 is a view of an example of a graphics system 100.

FIG. 10 is a view for describing an example in which a first variable is a uniform variable, wherein the first variable may include various variable forms.

The graphics system 100 further includes a cache 1010.

The variable processor 910 calculates an execution time of the operation formula that is foldable. The execution time is a time during which operations included in the operation formula are performed. The execution time is defined as C.

The variable processor 910 generates nodes corresponding to subsets based on a lattice structure. For example, when the first variable is a uniform variable, and a set including all of the uniform variables declared in a shader program is defined as a set U, nodes corresponding to all subsets included in the set U are generated based on the lattice structure. The nodes are generated based on an inclusion relation from a node corresponding to a null set to a node corresponding to the set U.

The variable processor 910 calculates a weight of each node based on the execution times C of the operation formulas that are removed by the folding operation. To calculate the weight, an initial value of the weight of each node is calculated by the variable processor 910. The initial value of the weight of a node is a sum of the execution times C of all operation formulas, if any, that require all uniform variables included in a subset corresponding to the node to perform folding. To calculate the weight of the node, the variable processor 910 calculates the initial value of the weight, and then adds weights of lower subsets based on the inclusion relation from the null set to the set U.

In one example, the shader program generator 920 may store the uniform variable, information of a value allocated to each uniform variable, and generated machine language program information in the cache 1010, so that with respect to each shader program, the shader program generator 920 stores in the cache 1010 the value allocated to each uniform variable included in a uniform variable subset selected by the variable processor 910, and the machine language program generated by replacing each uniform variable of the shader program by the allocated value and compiling the replaced uniform variable. The cache 1010 is a specific area in the memory 130 or an additional storage space, and if there already exists in the cache 1010 a machine language program generated with respect to a specific value, the recompiling process may be omitted, and instead, the machine language program stored in the cache 1010 may be used, thereby reducing the compiling time. For example, assume that two shader programs P1 and P2 include the same uniform variable X. The cache 1010 stores the uniform variable X and a value allocated to the uniform variable X. Also, the cache 1010 stores the machine language program that is a result of replacing the value allocated to the uniform variable X in the shader programs P1 and P2 and compiling the shader programs P1 and P2 with the replaced value. In detail, when the value allocated to the uniform variable X is a constant 3, the machine language programs B1 and B2 that are the results of compiling the shader programs P1 and P2 may be represented by Equation 3 below.

$$[(P1, X=3) \rightarrow B1]$$

$$[(P2, X=3 \rightarrow B2)] \quad (3)$$

The machine language program varies according to shader programs and values allocated to uniform variables included in the shader programs. The same shader program may be repeatedly called in a rendering process. If the value allocated to the uniform variable and the called shader program are the same, and a machine language program corresponding to the shader program is pre-stored, the machine language program may be provided without an additional compiling process. For example, the shader program P1 in which the value allocated to the uniform variable X is a constant 3 in the rendering process may be called twice. When the shader program P1 is first called, the shader program generator 920 generates a machine language program B1, which is a result of allocating the constant 3 to the uniform variable X and compiling the shader program P1, and stores the generated machine language program B1 in the cache 1010. Then, when the shader program P1 in which the constant 3 is allocated to the uniform variable X is called again, the shader program generator 920 generates the shader program based on the machine language program stored in the cache 1010 without compiling the shader program P1 again. Thus, since the shader program generator 920 omits the recompiling process and uses the machine language program stored in the cache 1010, the compiling time is reduced.

The graphics system 100, the computer 110, the renderer 120, and the memory 130 illustrated in FIG. 1, the computer 110, the variable processor 910, and the shader program generator 920 illustrated in FIG. 9, and the graphics system 100, the computer 110, the renderer 120, the memory 130, the variable processor 910, the shader program generator 920, and the cache 1010 illustrated in FIG. 10 that perform the operations described herein with respect to FIGS. 1-10 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-10. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3A, 3B, and 4 that perform the operations described herein with respect to FIGS. 1-10 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of generating a shader program, the method comprising:
    determining one or more first variables to be used to perform a folding operation that replaces operation formulas included in the shader program by a constant or a second variable;
    generating a plurality of subsets of a set of all determined one or more first variables;
    calculating execution times of operation formulas included in the shader program on which the folding operation can be performed;
    calculating a performance gain of each subset generated from the set of all determined one or more first variables based on the execution times;

selecting a subset comprising first variables to be replaced from the subsets based on the calculated performance gain of each subset; and generating the shader program in which the operation formulas are replaced by the constant or the second variable based on the first variables included in the selected subset.

2. The method of claim 1, wherein the calculating of the performance gain further comprises:

generating nodes corresponding to the subsets based on a lattice structure; and calculating a weight of each node, the weight being defined as a sum of the execution times of operation formulas on which the folding operation can be performed corresponding to the node and any lower nodes of the node in the lattice structure.

3. The method of claim 2, wherein the calculating of the weight of each node comprises calculating the weight based on an inclusion relation from a node corresponding to a null set to a node corresponding to the selected subset of all first variables included in the shader program.

4. The method of claim 2, wherein selecting the subset comprising first variables to be replaced from the subsets comprises selecting the subset based on the weight of the node and a number of first variables included in the subset.

5. The method of claim 2, wherein the selecting of the subset comprising the first variable to be replaced from the subsets comprises selecting the subset based on a number of times the shader program is called and a compiling time of the shader program.

6. The method of claim 2, wherein the selecting of the subset comprising the first variable to be replaced from the subsets comprises selecting the subset dynamically in response to the shader program being repeatedly called.

7. The method of claim 1, wherein the operation formulas on which the folding operation can be performed are operation formulas in which all operands are constants or uniform variables.

8. The method of claim 1, further comprising when a shader program is first called, storing in a cache a result of compiling the shader program based on the first variable and a value allocated to the first variable;

wherein when the shader program in the cache is called again with the same value allocated to the first variable, generating the shader program comprises generating the shader program in which the operation formulas are replaced by the constant or the second variable based on the compiled shader program stored in the cache.

9. A computer-readable storage medium storing instructions for causing computing hardware to perform the method of claim 1.

10. A computer configured to generate a shader program, the computer comprising:

a variable processor configured to determine one or more first variables to be used to perform a folding operation that replaces operation formulas included in the shader program by a constant or a second variable;

generate a plurality of subsets of a set of all determined one or more first variables;

calculate execution times of operation formulas included in the shader program on which the folding operation can be performed;

calculate a performance gain of each subset generated from the set of all determined one or more first variables based on the execution times; and select a subset comprising first variables to be replaced from the subsets based on the calculated performance gain of each subset; and a shader program generator configured to generate the shader program in which the operation formulas are replaced by the constant or the second variable based on the first variables included in the selected subset.

11. The computer of claim 10, wherein the variable processor is further configured to:

generate nodes corresponding to the subsets based on a lattice structure; and calculate a weight of each node, the weight being defined as a sum of the execution times of operation formulas on which the folding operation can be performed corresponding to the node and any lower nodes of the node in the lattice structure.

12. The computer of claim 11, wherein the variable processor is further configured to calculate the weight of each node based on an inclusion relation from a node corresponding to a null set to a node corresponding to the selected subset of all first variables included in the shader program.

13. The computer of claim 11, wherein the variable processor is further configured to select the subset based on the weight of the node and a number of first variables included in the subset.

14. The computer of claim 11, wherein the variable processor is further configured to select the subset based on a number of times the shader program is called and a compiling time of the shader program.

15. The computer of claim 10, wherein the operation formulas on which the folding operation can be performed are operation formulas in which all operands are constants or uniform variables.

16. The computer of claim 10, wherein the variable processor is further configured to store in a cache a result of compiling the shader program based on the first variable and a value allocated to the first variable, when a shader program is first called; and the shader program generator is further configured to generate the shader program in which the operation formulas are replaced by the constant or the second variable based on the compiled shader program stored in the cache, when the shader program in the cache is called again with the same value allocated to the first variable.

* * * * *